United States Patent
Itagaki et al.

(10) Patent No.: US 6,767,671 B2
(45) Date of Patent: Jul. 27, 2004

(54) NON-AQUEOUS ELECTROLYTIC SOLUTION AND SECONDARY BATTERY CONTAINING SAME

(75) Inventors: Hiroaki Itagaki, Kanagawa (JP); Chikara Kiyohara, Kanagawa (JP)

(73) Assignee: Mitsubishi Chemical Corporation, Tokyo (JP)

( * ) Notice: Subject to any disclaimer, the term of this patent is extended or adjusted under 35 U.S.C. 154(b) by 208 days.

(21) Appl. No.: 09/903,750

(22) Filed: Jul. 13, 2001

(65) Prior Publication Data

US 2002/0025477 A1 Feb. 28, 2002

(30) Foreign Application Priority Data

Jul. 14, 2000 (JP) ........................................ 2000-213624

(51) Int. Cl.$^7$ ................................................ H01M 6/16
(52) U.S. Cl. ...................... 429/328; 429/322; 429/323; 429/231.1; 429/231.3; 429/224; 429/231.8; 429/231.4
(58) Field of Search ................................ 429/328, 199, 429/224, 322, 323, 231.1, 231.3, 231.8, 231.4

(56) References Cited

U.S. PATENT DOCUMENTS 5,731,106 A    3/1998    Tsutsumi et al.

6,291,107 B1 * 9/2001 Shimizu ..................... 429/324

FOREIGN PATENT DOCUMENTS

| JP | 3-285271 | * 12/1991 |
| JP | 7-65855 | 3/1995 |
| JP | 7-105977 | 4/1995 |
| JP | 7-211351 | 8/1995 |
| JP | 9-106833 | 4/1997 |
| JP | 9-204932 | 8/1997 |

OTHER PUBLICATIONS

H. Nakamura, et al., Hyomen Gijutsu (Surface Technology), vol. 46, No. 12, pp. 1187–1188, "Effect of Additives to the Nanaqueous Electrolyte on Cycling Performance of Lithium Anode for Secondary Li–Cells", 1995 (with English translation).

* cited by examiner

Primary Examiner—Laura Weiner
(74) Attorney, Agent, or Firm—Oblon, Spivak, McClelland, Maier & Neustadt, P.C.

(57) ABSTRACT

A non-aqueous electrolytic solution capable of depressing deterioration of battery properties in a high temperature environment is provided. A secondary battery is also provided. The non-aqueous electrolytic solution containing at least an organic solvent and a lithium salt further contains a particular pyridine compound.

18 Claims, No Drawings

NON-AQUEOUS ELECTROLYTIC SOLUTION AND SECONDARY BATTERY CONTAINING SAME

FIELD OF THE INVENTION

This invention relates to a non-aqueous electrolytic solution and a secondary battery containing the same.

BACKGROUND OF THE INVENTION

As an active material for a positive electrode which provides a practically usable lithium secondary battery, lithium transition metal oxides are believed to have a bright prospect. Of the lithium transition metal oxides, lithium cobalt oxide, lithium nickel oxide and lithium manganese oxide are known to exhibit high-performance battery properties. Therefore, research and development have been vigorously conducted mainly on these compounds to put such batteries into practical use. However, even in case of using these materials, various problems have to be overcome for making the batteries to reach a practically usable level.

One of the problems to be solved first is a problem of deterioration of battery properties in a high temperature environment. Deterioration of properties of lithium secondary batteries in a high temperature environment is caused by various factors. As such factors, there are illustrated, for example, change in properties of lithium transition metal oxide, decomposition of the electrolytic solution, and breakage of a film formed on a negative electrode.

In particular, lithium manganese oxides such as $LiMn_2O_4$ are inferior to lithium cobalt oxides or lithium nickel oxides in battery properties in the high temperature environment. Therefore, in cases when the lithium manganese oxides are used as an active material for a positive electrode, it is particularly required to solve the problem of deterioration of battery properties in the high temperature environment.

Thus, it has been attempted to improve battery properties of the lithium manganese oxides in the high temperature environment by replacing part of manganese atoms therein by other element. For example, J. Electrochem. soc., Vol. 145, No. 8 (1998) 2726 to 2732 discloses lithium manganese oxides in which part of manganese atoms are replaced by other elements such as Ga or Cr.

However, secondary batteries containing a non-aqueous electrolytic solution have been required to have an increasingly higher battery properties and, therefore, there have been strong demands for improvement of battery properties when used in the high temperature environment.

With the above-described circumstances in mind, the inventors have investigated in detail the cause of deterioration of battery properties in the high temperature environment. As a result, the inventors have surmised the mechanism of deterioration of battery properties in the high temperature environment as follows. That is, an acid generated by decomposition of the lithium salt used as an electrolyte supposedly accelerates decomposition of the active material for a positive electrode in the high temperature environment. For example, deterioration of battery properties in the high temperature environment in the case of using a lithium manganese oxide as an active material for a positive electrode and a fluorine-containing compound as a lithium salt is supposedly caused by dissolution of manganese into the non-aqueous electrolytic solution due to reaction between hydrofluoric acid having been generated by the reaction between the lithium salt and water and the lithium manganese oxide at a high temperature.

On the above-described supposition, the inventors have intensively investigated the problem of the deterioration of battery properties in the high temperature environment and, as a result, have found that the problem of deterioration of the battery properties in the high temperature environment can be solved in a different manner from the conventional manner of improving active materials for a positive electrode. That is, the inventors have found that incorporation of a compound which can trap an acid to be generated by decomposition of the lithium salt used as an electrolyte serves to depress decomposition of the active material for a positive electrode and that use of particular substituted pyridine compounds as compounds having a strong ability of trapping the acid (i.e., strongly basic compounds) can improve the battery properties in the high temperature environment, thus having completed the invention based on the findings.

SUMMARY OF THE INVENTION

That is, a first gist of the invention lies in a non-aqueous electrolytic solution comprising an organic solvent and a lithium salt, which further contains a pyridine compound represented by the following formula (1):

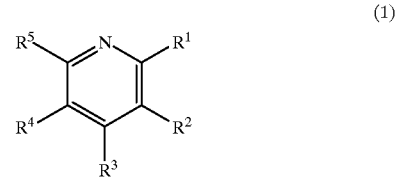

(1)

wherein $R^1$ to $R^5$ each independently represents a hydrogen atom or a substituent composed of an alkyl group having 1 to 20 carbon atoms, an alkenyl group having 2 to 20 carbon atoms, an alkoxy group having 1 to 4 carbon atoms, an aryloxy group having 6 to 10 carbon atoms, a dialkylamino group having 2 to 8 carbon atoms, a 3-thienyl group, a cyano group, a fluoro group, an alkoxycarbonyl group having 1 to 6 carbon atoms, an arylcarbonyl group having 6 to 10 carbon atoms, an alkylcarbonyl group having 1 to 12 carbon atoms, a cyanoalkyl group having 1 to 4 carbon atoms, an alkoxycarbonylalkyl group having 3 to 13 carbon atoms, a pyrrol-1-ylmethyl group, a 1-pyrrolidinyl group, a 1-piperidino group, a phenyl group (provided that, in this case, two or more of $R^1$ to $R^5$ represent phenyl groups), a 1H-pyrrol-1-yl group, an alkoxyalkyl group having 2 to 12 carbon atoms, a dialkylaminoalkyl group having 3 to 18 carbon atoms, an aryloxy group having 6 to 10 carbon atoms, an arylalkyl group the aryl moiety of which has 6 to 10 carbon atoms and the alkyl moiety of which has 2 to 6 carbon atoms, an isothiocyano group, a dialkylaminocarbonyl group having 2 to 8 carbon atoms, a 5-oxazole group, a trifluoromethyl group, a 1-pyrrolidine-2,5-dione group, a 1H-pyrrol-1-ylalkyl group having 1 to 6 carbon atoms, a 4,5-dihydrooxazol-2-yl group, a 1,3,4-oxadiazol-2-yl group, a nitro group, a 1-piperidinyl group, a 1-alkylpyrrol-2-yl group having 1 to 6 carbon atoms, a 4-1,2,3-thiadiazole group, a 2-1,3,4-oxadiazole group, a morpholino group and a 1-pyrrolin-2-yl group, with the proviso that, at least one of $R^1$ to $R^5$ represents aforesaid substituent and that, when $R^1$ to $R^5$ are a hydrogen atom or an alkyl group, at least one of $R^1$ to $R^5$ is an alkyl group having 2 or more carbon atoms and sum of the carbon atoms of $R^1$ to $R^5$ is 3 or more.

The second gist of the invention lies in a secondary battery, which comprises the non-aqueous electrolytic solution, a positive electrode and a negative electrode.

That is, the gist of the invention resides in the following aspects.

(1) A non-aqueous electrolytic solution comprising an organic solvent and a lithium salt, which further contains a pyridine compound represented by the following formula (1):

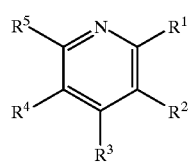

wherein $R^1$ to $R^5$ each independently represents a hydrogen atom or a substituent composed of an alkyl group having 1 to 20 carbon atoms, an alkenyl group having 2 to 20 carbon atoms, an alkoxy group having 1 to 4 carbon atoms, an aryloxy group having 6 to 10 carbon atoms, a dialkylamino group having 2 to 8 carbon atoms, a 3-thienyl group, a cyano group, a fluoro group, an alkoxycarbonyl group having 1 to 6 carbon atoms, an arylcarbonyl group having 6 to 10 carbon atoms, an alkylcarbonyl group having 1 to 12 carbon atoms, a cyanoalkyl group having 1 to 4 carbon atoms, an alkoxycarbonylalkyl group having 3 to 13 carbon atoms, a pyrrol-1-ylmethyl group, a 1-pyrrolidinyl group, a 1-piperidino group, a phenyl group (provided that, in this case, two or more of $R^1$ to $R^5$ represent phenyl groups), a 1H-pyrrol-1-yl group, an alkoxyalkyl group having 2 to 12 carbon atoms, a dialkylaminoalkyl group having 3 to 18 carbon atoms, an aryloxy group having 6 to 10 carbon atoms, an arylalkyl group the aryl moiety of which has 6 to 10 carbon atoms and the alkyl moiety of which has 2 to 6 carbon atoms, an isothiocyano group, a dialkylaminocarbonyl group having 2 to 8 carbon atoms, a 5-oxazole group, a trifluoromethyl group, a 1-pyrrolidine-2,5-dione group, a 1H-pyrrol-1-ylalkyl group having 1 to 6 carbon atoms, a 4,5-dihydro-oxazol-2-yl group, a 1,3,4-oxadiazol-2-yl group, 2-yl group, a nitro group, a 1-piperidinyl group, a 1-alkylpyrrol-2-yl group having 1 to 6 carbon atoms, a 4-1,2,3-thiadiazole group, a 2-1,3,4-oxadiazole group, a morpholino group and a 1-pyrrolin-2-yl group, with the proviso that, at least one of $R^1$ to $R^5$ represents aforesaid substituent and that, when $R^1$ to $R^5$ are a hydrogen atom or an alkyl group, at least one of $R^1$ to $R^5$ is an alkyl group having 2 or more carbon atoms and sum of the carbon atoms of $R^1$ to $R^5$ is 3 or more;

(2) The non-aqueous electrolytic solution as described in (1), wherein $R^1$ to $R^5$ in the formula (1) each independently represents a hydrogen atom or a substituent composed of an alkyl group having 1 to 20 carbon atoms, an alkenyl group having 3 to 20 carbon atoms, an alkoxy group having 1 to 4 carbon atoms, an aryloxy group having 6 to 10 carbon atoms and a dialkylamino group having 2 to 8 carbon atoms;

(3) The non-aqueous electrolytic solution as described in (1), wherein at least one of $R^1$ to $R^5$ in the formula (1) represents an alkyl group having 1 to 20 carbon atoms with the proviso that, when $R^1$ to $R^5$ are a hydrogen atom or an alkyl group, at least one of $R^1$ to $R^5$ is an alkyl group having 2 or more carbon atoms and sum of the carbon atoms of $R^1$ to $R^5$ is 3 or more;

(4) The non-aqueous electrolytic solution as described in any one of (1) to (3), wherein, when $R^1$ to $R^5$ in the formula (1) are a hydrogen atom or an alkyl group, at least one of $R^1$ to $R^5$ is an alkyl group having 3 or more carbon atoms;

(5) The non-aqueous electrolytic solution as described in any one of (1) to (4), wherein, when $R^1$ to $R^5$ in the formula (1) are a hydrogen atom or an alkyl group, sum of the carbon atoms of $R^1$ to $R^5$ is 4 or more;

(6) The non-aqueous electrolytic solution as described in any one of (1) to (5), wherein, when $R^1$ to $R^5$ in the formula (1) are a hydrogen atom or an alkyl group, sum of the carbon atoms of $R^1$ to $R^5$ is 60 or less;

(7) The non-aqueous electrolytic solution as described in any one of (1) to (6), wherein $R^1$ and $R^5$ in the aforesaid formula (1) are the aforesaid substituents;

(8) The non-aqueous electrolytic solution as described in (7), wherein $R^3$ is also the aforesaid substituent.

(9) The non-aqueous electrolytic solution as described in any one of (1) to (8), wherein the pyridine compound is at least one member selected from the group consisting of 2-propylpyridine, 3-propylpyridine, 4-propylpyridine, 2-isopropylpyridine, 4-isopropylpyridine, 3-butylpyridine, 4-butylpyridine, 4-isobutylpyridine, 2-methyl-5-butylpyridine, 2-tert-butylpyridine, 4-tert-butylpyridine, 2,6-di-tert-butylpyridine, 2,6-di-tert-butyl-4-methylpyridine, 2,4,6-tri-tert-butylpyridine, 2-tert-butyl-6-methyl-pyridine, 2-tert-butyl-4-methylpyridine, 4-tert-butyl-2-methylpyridine, 2-tert-butyl-6-isopropylpyridine, 5-nonyl)pyridine, 2-pentylpyridine, 2-(3-pentyl)pyridine, 4-(3-pentyl)pyridine, 2-hexylpyridine, 4-octylpyridine, 2-undecylpyridine, 2-(1-butylpentyl)pyridine, 4-(1-propenylbutenyl)pyridine, 4-(1-butenylpentenyl)pyridine, 2,6-di-tert-butyl-4-(dimethylamino)pyridine, 2-(3-thienyl)pyridine, 2-cyanopyridine, 2-fluoropyridine, pentafluoropyridine, 2-dimethylaminopyridine, 2-methoxypyridine, 2-pyridinecarboxylic acid ethyl ester, 2-benzoylpyridine, 2-acetylpyridine, 2-(cyanomethyl)pyridine, 4-(3-phenylpropyl)pyridine, 2-pyridylacetic acid methyl ester, 3-(pyrrol-1-ylmethyl)pyridine, 4-(1-pyrrolidinyl)pyridine, 4-piperidinopyridine, 2,4,6-triphenylpyridine, 2-(1H-pyrrol-1-yl)pyridine, 2-methoxyethylpyridine, 4-(2-diethylaminoethyl)pyridine, 2-phenoxypyridine, 3-pyridylisothiocyanate, N,N-dimethylnicotinamide, 5-(pyrid-4-yl)oxazole, 3-trifluoromethylpyridine, 1-(3-pyridyl)pyrrolidine-2,5-dione, 4-(1H-pyrrol-1-ylmethyl)pyridine, 3-(4,5-dihydro-oxazol-2-yl)pyridine, 4-(1,3,4)oxadiazol-2-ylpyridine, 3-nitropyridine, 2,6-di(1-piperidinyl)pyridine 3-(1-methylpyrrol-2-yl)pyridine, 3-methoxypyridine, 4-(4-pyridyl)-1,2,3-thiadiazole, 2-(3-pyridyl)-1,3,4-oxadiazole, 2,6-dimorpholinopyridine and 2-(1-pyrrolin-2-yl)pyridine;

(10) The non-aqueous electrolytic solution as described in any one of (1) to (9), wherein the pyridine compound is a pyridine compound having a bonding energy of 16 kcal/mol or more with hydrofluoric acid determined according to the following calculation method:

(Method for Calculating Bonding Energy)

A bonding energy between the aforesaid pyridine compound and hydrofluoric acid is calculated according to ab initio method (program: Gaussian 94; base set: 3–21G); and the term "bonding energy" as used herein means a value obtained by summing the energy values of the pyridine compound and hydrofluoric acid determined by geometry optimization of each of them, and subtracting from the sum the energy value determined by geometry optimization of an adduct of the pyridine compound and hydrofluoric acid connecting to each other through nitrogen atom of the pyridine compound and hydrogen atom of hydrofluoric acid, that is, (Bonding energy)=(Energy value of the pyridine compound) +(Energy value of hydrofluoric acid)−(Energy value of the adduct between the pyridine compound and hydrofluoric acid);

(11) The non-aqueous electrolytic solution as described in any one of (1) to (10), wherein the pyridine compound is contained in an amount of 0.001% by weight based on the sum of the organic solvent and the lithium salt to saturation;
(12) The non-aqueous electrolytic solution as described in any one of (1) to (11), wherein the lithium salt is a compound containing a fluorine atom or fluorine atoms;
(13) A secondary battery, which comprises the non-aqueous electrolytic solution described in any one of (1) to (12), a positive electrode and a negative electrode;
(14) The secondary battery as described in (13), wherein the positive electrode comprises an active material for a positive electrode, the active material for a possitive electrode being a lithium transition metal oxide;
(15) The secondary battery as described in (14), wherein the lithium transition metal oxide is lithium manganese oxide or lithium cobalt oxide;
(16) The secondary battery as described in (15), wherein the lithium manganese oxide is spinel type lithium manganese oxide;
(17) The secondary battery as described in (15) or (16), wherein the lithium manganese oxide is lithium manganese oxide wherein part of manganese sites are occupied by other element;
(18) The secondary battery as described in (17), wherein the other element occupying the manganese sites is at least one metal element selected from the group consisting of Al, Ti, V, Cr, Fe, Co, Li, Ni, Cu, Zn, Mg, Ga and Zr;
(19) The secondary battery as described in any one of (13) to (18), wherein the negative electrode comprises an active material for a negative electrode, the active material for a negative electrode being a carbonaceous substance; and
(20) The secondary battery as described in (19), wherein the carbonaceous substance is graphite having a d value of lattice plane (002 plane) in X ray diffraction of 0.335 to 0.340 nm.

DETAILED DESCRIPTION OF THE INVENTION

Additionally, JP-A-7-65855 (The term "JP-A" as used herein means an "unexamined published Japanese patent application") discloses a secondary battery using a fluorine-containing electrolyte, which contains therein a substance containing at least one of nitrogen atom, phosphorus atom and sulfur atom having a lone pair of electrons, and discloses polyvinylpyridine as a specific example of the substance. However, polyvinylpyridine is different in structure from the pyridine compounds to be used in the invention. In addition, the publication describes that "in a battery system employing intercalation or insertion type electrodes as both a positive electrode and a negative electrode, the amount of lithium contained in the positive electrode and negative electrode is limited, and hence deviation from the limited lithium amount directly exhibits serious influences on the charge-discharge performance, thus hydrofluoric acid being intended to be trapped by the substance to thereby prevent it from binding with lithium ion" ([0008], [0011]), and does not describe nor suggest improvement of the battery properties at the high temperature, which is the object of the present invention.

Additionally, "Hyomen Gijutsu", Vol. 46, No. 12, 1995, pp. 1187 to 1188 discloses the technology of adding 2-ethylpyridine to a non-aqueous electrolytic solution for the purpose of improving cycle properties of a lithium negative electrode. However, this pyridine compound is different in structure from the pyridine compounds to be used in the invention. In addition, this literature does not describe nor suggest improvement of the battery properties at the high temperature.

JP-A-7-105977 discloses the technology of adding an alkylpyridine wherein a hydrogen atom of pyridine in o-, m- or p-position thereof is replaced by an alkyl group having 1 to 3 carbon atoms (specifically, α-picoline, β-picoline and γ-picoline) to a non-aqueous electrolytic solution in order to improve cycle properties of a secondary battery containing a non-aqueous electrolytic solution and using a carbon material as a negative electrode material ([0006]). However, this publication does not describe nor suggest improvement of the battery properties at the high temperature.

JP-A-7-211351 describes the technology of adding a bidentate-type chelating agent such as 1,10-phenanthroline, 2,2'-bipyridyl or ethylenediamine and a tridentate-type chelating agent such as terpyridine or diethylenetriamine to a non-aqueous electrolytic solution in order to improve charge-discharge efficiency, cycle properties and rapidly charging properties of secondary battery. However, these pyridine compounds are different in structure from the pyridine compounds to be used in the invention. In addition, this publication does not describe nor suggest improvement of the battery properties at the high temperature.

JP-A-9-106833 discloses the technology of adding a 1,10-phenanthroline derivative, phenylpyridine or the derivative thereof, or the like to a non-aqueous electrolytic solution in order to obtain good charge-discharge efficiency upon repeating charge-discharge cycle while maintaining a high voltage and a high energy density. However, these pyridine compounds are different in structure from the pyridine compounds to be used in the invention. In addition, this publication does not describe nor suggest improvement of the battery properties at the high temperature.

JP-A-9-204932 (corresponding U.S. Pat. No. 5,731,106) discloses the technology of adding a nitrogen-containing organic compound such as quinoxaline, indole, 2,3-lutidine, N-methylpyrazole, phenazine, phthalazine or pyridazine in order to obtain good charge-discharge efficiency upon repeating charge-discharge cycle while maintaining a high voltage and a high energy density. However, these pyridine compounds are different in structure from the pyridine compounds to be used in the invention. In addition, this publication does not describe nor suggest improvement of the battery properties at the high temperature.

The non-aqueous electrolytic solution of the invention comprises an organic solvent and a lithium salt, which further contains a pyridine compound represented by the following formula (1):

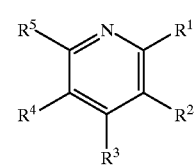

(1)

wherein $R^1$ to $R^5$ each independently represents a hydrogen atom or a substituent composed of an alkyl group having 1 to 20 carbon atoms, an alkenyl group having 2 to 20 carbon atoms, an alkoxy group having 1 to 4 carbon atoms, an aryloxy group having 6 to 10 carbon atoms, a dialkylamino group having 2 to 8 carbon atoms, a 3-thienyl group, a cyano group, a fluoro group, an alkoxycarbonyl group having 1 to 6 carbon atoms, an arylcarbonyl group having 6 to 10 carbon atoms, an alkylcarbonyl group having 1 to 12 carbon atoms, a cyanoalkyl group having 1 to 4 carbon atoms, an alkoxycarbonylalkyl group having 3 to 13 carbon atoms, a pyrrol- 1-ylmethyl group, a 1-pyrrolidinyl group, a 1-piperidino group, a phenyl group (provided that, in this case, two or more of $R^1$ to $R^5$ represent phenyl groups), a 1H-pyrrol-1-yl group, an alkoxyalkyl group having 2 to 12 carbon atoms, a dialkylaminoalkyl group having 3 to 18 carbon atoms, an aryloxy group having 6 to 10 carbon atoms, an arylalkyl group the aryl moiety of which has 6 to 10 carbon atoms and the alkyl moiety of which has 2 to 6 carbon atoms, an isothiocyano group, a dialkylaminocarbonyl group having 2 to 8 carbon atoms, a 5-oxazole group, a trifluoromethyl group, a 1-pyrrolidine-2,5-dione group, a 1H-pyrrol-1-ylalkyl group having 1 to 6 carbon atoms, a 4,5-dihydro-oxazol-2-yl group, a 1,3,4-oxadiazol-2-yl group, a nitro group, a 1-piperidinyl group, a 1-alkylpyrrol-2-yl group having 1 to 6 carbon atoms, a 4-1,2,3-thiadiazole group, a 2-1,3,4-oxadiazole group, a morpholino group and a 1-pyrrolin-2-yl group, with the proviso that at least one of $R^1$ to $R^5$ is the aforesaid substituent, i.e., all of $R^1$ to $R^5$ do not represent a hydrogen atom at the same time.

In a preferred embodiment, $R^1$ to $R^5$ in the formula (1) each independently represents a hydrogen atom, an alkyl group having 1 to 20 carbon atoms, an alkenyl group having 3 to 20 carbon atoms, an alkoxy group having 1 to 4 carbon atoms, an aryloxy group having 6 to 10 carbon atoms or a dialkylamino group having 2 to 8 carbon atoms.

The alkyl group having 1 to 20 carbon atoms is exemplified by straight or branched alkyl groups having 1 to 20 carbon atoms such as methyl group, ethyl group, n-propyl group, i-propyl group, n-butyl group, sec-butyl group, tert-butyl group, n-pentyl group, isopentyl group, neopentyl group, tert-pentyl group and tert-hexyl group and the like, and cyclic alkyl groups having 6 to 20 carbon atoms such as cyclohexyl group, cyclooctyl group or adamantyl group and the like. Of these alkyl groups, tert-butyl group, tert-pentyl group, tert-hexyl group and cyclohexyl group are preferred.

The alkenyl group having 3 to 20 carbon atoms is exemplified by straight or branched alkenyl group having 3 to 20 carbon atoms such as 1-propenyl group, 2-propenyl group, isopropenyl group, butynyl group, pentynyl group and (1-butynyl)pentyl group and the like. Of these alkenyl groups, those which do not have $=CH_2$ moiety such as 2-propenyl group and isopropenyl group are preferred.

The alkoxy group having 1 to 4 carbon atoms is exemplified by methoxy group, ethoxy group, isopropoxy group, tert-butoxy group and the like. Of these alkoxy groups, methoxy group and ethoxy group are preferred.

The aryloxy group having 6 to 10 carbon atoms is exemplified by phenoxy group, naphthoxy group and the like. Of these aryloxy groups, phenoxy group is preferred.

The dialkylamino group having 2 to 8 carbon atoms is exemplified by dimethylamino group, diethylamino group and the like. Of these dialkylamino groups, dimethylamino group is preferred.

The alkoxycarbonyl group having 1 to 6 carbon atoms is exemplified by ethoxycarbonyl group and the like.

The arylcarbonyl group having 6 to 10 carbon atoms is exemplified by phenylcarbonyl group and the like.

The alkylcarbonyl group having 1 to 12 carbon atoms is exemplified by methylcarbonyl group, ethylcarbonyl group and the like. Of these alkylcarbonyl group, methylcarbonyl group is preferred.

The cyanoalkyl group having 1 to 4 carbon atoms is exemplified by cyanomethyl group and the like.

The alkoxycarbonylalkyl group having 3 to 13 carbon atoms is exemplified by methoxycarbonylmethyl group and the like.

The alkoxyalkyl group having 2 to 12 carbon atoms is exemplified by methoxyethyl group and the like.

The dialkylaminoalkyl group having 3 to 18 carbon atoms is exemplified by diethylaminoethyl group and the like.

The aryloxy group having 6 to 10 carbon atoms is exemplified by phenoxy group and the like.

The arylalkyl group the aryl moiety of which has 6 to 10 carbon atoms and the alkyl moiety of which has 2 to 6 carbon atoms is exemplified by 3-phenylpropyl group and the like.

The dialkylaminocarbonyl group having 2 to 8 carbon atoms is exemplified by dimethylaminocarbonyl group and the like.

The 1H-pyrrol-1-ylalkyl group having 1 to 6 carbon atoms is exemplified by 1H-pyrrol-1-ylmethyl group and the like.

The 1-alkylpyrrol-2-yl group having 1 to 6 carbon atoms is exemplified by 1-methylpyrrol-2-yl group and the like.

In a preferred embodiment, at least one of $R^1$ to $R^5$ in the formula (1) is an alkyl group having 1 to 20 carbon atoms. That is, as long as at least one of $R^1$ to $R^5$ is an alkyl group having 1 to 20 carbon atoms, others may be any of the aforesaid substituents such as an alkyl group having 1 to 20 carbon atoms.

However, in cases when $R^1$ to $R^5$ in the formula (1) each represents a hydrogen atom or an alkyl group, at least one of $R^1$ to $R^5$ is an alkyl group having 2 or more carbon atoms, with sum of the carbon atoms of $R^1$ to $R^5$ being 3 or more. When all of $R^1$ to $R^5$ are an alkyl group or a hydrogen atom, the bonding energy between the pyridine compound and hydrofluoric acid becomes stronger and stability as a pyridine compound is increased.

In a preferred embodiment of the invention, $R^1$ to $R^5$ in the formula (1) each represents a hydrogen atom or an alkyl group, at least one of $R^1$ to $R^5$ is an alkyl group having 2 or more carbon atoms, and sum of the carbon atoms of $R^1$ to $R^5$ is 3 or more. In this embodiment, at least one of $R^1$ to $R^5$ is an alkyl group having preferably 3 or more carbon atoms, more preferably 4 or more carbon atoms. An increase in number of carbon atoms serves to more strengthen bonding energy between the pyridine compound and hydrofluoric acid. On the other hand, the number of carbon atoms of the aforesaid alkyl group is usually 20 or less, preferably 10 or less, more preferably 5 or less. If the number of the carbon atoms exceeds the above range, there can result an increase in internal resistance of the battery due to decomposition of the aforesaid alkyl group. Further, sum of the carbon atoms of $R^1$ to $R^5$ is preferably 4 or more, more preferably 5 or more. The bonding energy between the pyridine compound and hydrofluoric acid can be more strengthened by increasing sum of the carbon atoms. On the other hand, sum of the carbon atoms is 60 or less, preferably 30 or less, more preferably 15 or less. If sum of the carbon atoms exceeds the above range, there can result an increase in internal resistance of the battery due to decomposition of the alkyl group.

In a particularly preferred embodiment, $R^1$ and $R^5$ in the formula (1) are the aforesaid substituents such as an alkyl group having 1 to 20 carbon atoms. By selecting the aforesaid substituents as $R^1$ and $R^5$, the bonding energy between the pyridine compound and hydrofluoric acid becomes stronger and stability as the pyridine compound is increased. More preferably, not only $R^1$ and $R^5$ but also $R^3$ is the aforesaid substituent such as an alkyl group having 1 to 20 carbon atoms. By further selecting the aforesaid substituent as $R^3$, the bonding energy between the pyridine compound and hydrofluoric acid becomes much stronger and stability as the pyridine compound is more increased.

As preferred pyridine compounds to be used in the invention, there may be illustrated 2-propylpyridine, 3-propylpyridine, 4-propylpyridine, 2-isopropylpyridine, 4-isopropylpyridine, 3-butylpyridine, 4-butylpyridine, 4-isobutylpyridine, 2-methyl-5-butylpyridine, 2-tert-butylpyridine, 4-tert-butylpyridine, 2,6-di-tert-butylpyridine, 2,6-di-tert-butyl-4-methylpyridine, 2,4,6-tri-tert-butylpyridine, 2-tert-butyl-6-methylpyridine, 2-tert-butyl-4-methylpyridine, 4-tert-butyl-2-methylpyridine, 2-tert-butyl-6-isopropylpyridine, 4-(5-nonyl)pyridine, 2-pentylpyridine, 2-(3-pentyl)pyridine, 4-(3-pentyl)pyridine, -2-hexylpyridine, 4-octylpyridine, 2-undecylpyridine, 2-(1-butylpentyl)pyridine, 4-(1-propenylbutenyl)-1-butenylpentenyl)pyridine, 2,6-di-tert-butyl-4-(dimethy-lamino)pyridine, 2-(3-thienyl)pyridine, 2-cyanopyridine, 2-fluoropyridine, pentafluoropyridine, 2-dimethylamino-pyridine, 2-methoxypyridine, 2-pyridinecarboxylic acid ethyl ester, 2-benzoylpyridine, 2-acetylpyridine, 2-(cyanomethyl)pyridine, 4-(3-phenylpropyl)pyridine, 2-pyridylacetic acid methyl ester, 3-(pyrrol-1-ylmethyl)-pyridine, 4-(1-pyrrolidinyl)pyridine, 4-piperidinopyridine, 2,4,6-triphenylpyridine, 2-(1H-pyrrol-1-yl)pyridine, 2-methoxyethylpyridine, 4-(2-diethylaminoethyl)pyridine, 2-phenoxypyridine, 3-pyridylisothiocyanate, N,N-dimethyl-nicotinamide, 5-(pyrid-4-yl)oxazole, 3-trifluoromethyl-pyridine, 1-(3-pyridyl)pyrrolidine-2,5-dione, 4-(1H-pyrrol-1-ylmethyl) pyridine, 3-(4,5-dihydrooxazol-2-yl)pyridine, 4-(1,3,4) oxadiazol-2-ylpyridine, 3-nitropyridine, 2,6-di(1-piperidinyl)pyridine, 3-(1-methylpyrrol-2-yl)pyridine, 3-methoxypyridine, 4-(4-pyridyl 1,2,3-thiadiazole, 2-(3-pyridyl)-1,3,4-oxadiazole, 2,6-dimorpholinopyridine and 2-(1-pyrrolin-2-yl)pyridine. It is needless to say that a plurality of these compounds may be used in combination.

Of the above-described pyridine compounds, 3-butylpyridine, 4-butylpyridine, 4-isobutylpyridine, 2-methyl-5-butylpyridine, 2-tert-butylpyridine, 4-tert-butylpyridine, 2,6-di-tert-butylpyridine, 2,6-di-tert-butyl-4-methylpyridine, 2,4,6-tri-tert-butylpyridine, 2-tert-butyl-6-methylpyridine, 2-tert-butyl-4-methylpyridine, 4-tert-butyl-2-methylpyridine, 2-tert-butyl-6-isopropylpyridine, 4-(5-nonyl)pyridine, 2-pentylpyridine, 2-(3-pentyl)pyridine, 4-(3-pentyl)pyridine, 2-hexylpyridine, 4-octylpyridine, 2-undecylpyridine and 2-(1-butyl-pentyl)pyridine are more preferred. Of the above-described pyridine compounds, 2-tert-butylpyridine, 2,6-di-tert-butylpyridine, 2,6-di-tert-butyl-4-methylpyridine, 2,4,6-tri-tert-butylpyridine, 2-tert-butyl-6-methylpyridine, 2-tert-butyl-4-methylpyridine, 2-tert-butyl-6-isopropylpyridine, 2-pentylpyridine, 2-(3-pentyl)pyridine are particularly preferred. The remarkable advantages of the present invention can be obtained by using the pyridine compounds as described above.

The pyridine compounds to be used in the invention are preferably those pyridine compounds which have a bonding energy of 16 kcal/mol or more with hydrofluoric acid. Here, the bonding energy with hydrofluoric acid is calculated according to ab initio method (program: Gaussian 94; base set: 3–21G). The term "bonding energy" as used herein means a value obtained by summing the energy values of the pyridine compound and hydrofluoric acid determined by geometry optimization of each of them, and subtracting from the sum the energy value determined by geometry optimization of an adduct of the pyridine compound and hydrofluoric acid connecting to each other through nitrogen atom of the pyridine compound and hydrogen atom of hydrofluoric acid. That is, (Bonding energy)=(Energy value of the pyridine compound)+(Energy value of hydrofluoric acid)−(Energy value of the adduct between the pyridine compound and hydrofluoric acid).

The term "geometry optimization" as used herein means to determine the most stable structure according to the above-described calculation method using Gaussian 94.

Additionally, although Gaussian 94 program is used in the invention, the same calculation results can be obtained by other programs different in version such as Gaussian 80 and Gaussian 98 as long as the calculation formula itself is the same.

The bonding energy between the pyridine compound to be used in the invention and hydrofluoric acid is preferably 16 kcal/mol or more, more preferably 22 kcal/mol or more, still more preferably 27 kcal/mol or more. The higher the bonding energy with hydrofluoric acid, the more depressed is deterioration of battery properties in a high temperature environment.

Examples of the results of calculating the bonding energy between the pyridine compound to be used in the invention and hydrofluoric acid according to the calculating method described above are tabulated in Table 1.

TABLE 1

| Compound | Bonding Energy with Hydrofluoric acid (kcal/mol) |
| --- | --- |
| 2-propylpyridine | 19.6 |
| 2-tert-butylpyridine | 22.7 |
| 4-tert-butylpyridine | 16.3 |
| 2,6-di-tert-butylpyridine | 27.4 |
| 2,6-di-tert-butyl-4-methylpyridine | 27.8 |
| 2,4,6-tri-tert-butylpyridine | 27.4 |

The pyridine compounds to be used in the invention are contained in an amount of usually 0.001% by weight or more, preferably 0.005% by weight or more, more preferably 0.01% by weight or more, based on the sum of the amount of organic solvent and the amount of lithium salt. On the other hand, the pyridine compounds are contained in an amount of usually a saturation amount or less, preferably 10% by weight or less, more preferably 5% by weight or less, based on the sum of the amount of organic solvent and the amount of lithium salt. If the pyridine compounds are contained in an excess amount, there can result a decrease in discharge capacity whereas, if contained in an amount less than the lower limit, there can result only a small effect of improving high-temperature cycle properties.

The non-aqueous electrolytic solution to be used in the invention comprises an organic solvent and a lithium salt (in this specification, the organic solvent and the lithium salt are in some cases inclusively referred to as "solution for an electrolytic solution").

The organic solvent is not particularly limited but, for example, there may be used carbonates, ethers, ketones, sulfolane compounds, lactones, nitrites, chlorinated hydrocarbons, amines, esters, amides and phosphoric acid esters. As representative examples thereof, there are illustrated dimethylcarbonate, ethyl methyl carbonate, diethyl carbonate, propylene carbonate, ethylene carbonate, vinylene carbonate, tetrahydrofuran, 2-methyltetrahydrofuran, 1,4-dioxane, 4-methyl-2-pentanone, 1,2-dimethoxyethane, 1,12-diethoxyethane, γ-butyrolactone, 1,3-dioxolane, 4-methyl-1,3-dioxolane, diethyl ether, sulfolane, methylsulfolane, acetonitrile, propionitrile, benzonitrile, butyronitrile, valeronitrile, 1,2-dichloroethane, dimethylformamide, dimethylsulfoxide, trimethyl phosphate and triethyl phosphate. These solvents may be used independently or as a mixture of two or more of them.

In order to sufficiently dissociate the electrolyte, a solvent with a high dielectric constant is preferably contained as part of the organic solvent. The term "solvent with a high dielectric constant" as used herein means a compound having a specific dielectric constant of 20 or more at 25° C. As the solvent with a high dielectric constant, ethylene carbonate, propylene carbonate, and those solvents wherein hydrogen atom or atoms in ethylene carbonate or propylene carbonate are replaced by other elements such as a halogen or by an alkyl group or the like are preferably used. Proportion of the solvent with a high dielectric constant in the non-aqueous electrolytic solution is preferably 20% by weight or more, more preferably 30% by weight or more, most preferably 40% by weight or more. If the content of such solvent is too small, desired battery properties are not obtained in some cases.

In addition, the non-aqueous electrolytic solution of the invention contains a lithium salt. As the lithium salt, conventionally known ones may be used. As such lithium salt, there may be illustrated, for example, $LiClO_4$, $LiAsF_6$, $LiPF_6$, $LiBF_4$, $LiB(C_6H_5)_4$, $LiCl$, $LiBr$, $CH_3SO_3Li$, $CF_3SO_3Li$, $LiN(SO_2CF_3)_2$, $LiN(SO_2C_2F_5)_2$, $LiC(SO_2CF_3)_3$ and $LiN(SO_3CF_3)_2$. These lithium salts may be used in combination of two or more.

In the invention, the lithium salts are preferably compounds containing a fluorine atom or atoms. The pyridine compounds to be used in the invention can exhibit more effects when they are contained in an electrolytic solution containing a fluorine atom-containing compound as the lithium salt. When a fluorine atom-containing lithium salt is contained, the effect of the invention of trapping hydrofluoric acid becomes more remarkable since hydrofluoric acid is generated by the reaction between the lithium salt and water or the like. As the fluorine atom-containing lithium salts, there are illustrated, for example, $LiAsF_6$, $LiPF_6$, $LiBF_4$, $LiN(SO_2CF_3)_2$, $LiN(SO_2C_2F_5)_2$, $LiC(SO_2CF_3)_3$ and $LiN(SO_3CF_3)_2$. Of these lithium salts, $LiAsF_6$, $LiPF_6$, and $LiBF_4$ are preferred, with $LiPF_6$ being particularly preferred.

In the invention, a gas such as $CO_2$, $N_2O$, $CO$ or $SO_2$ may be contained in the non-aqueous electrolytic solution. In addition, an additive which forms a film on the negative electrode such as polysulfide $S_x^{2-}$ may be contained in the non-aqueous solution. Formation of the film on the negative electrode permits effective charge and discharge of lithium ion.

Molarity of the lithium salt in the non-aqueous electrolytic solution is preferably 0.5 to 2.0 mol/liter. If less then 0.5 mol/liter or more than 2.0 mol/liter, there can result a decreased electric conductivity of the non-aqueous electrolytic solution, which tends to deteriorate battery performance.

The secondary battery of the invention has the above-described non-aqueous electrolytic solution, a positive electrode and a negative electrode.

The positive electrode usually has a structure comprising a current collector having formed thereon a positive electrode material layer. The positive electrode material layer usually contains an active material for a positive electrode, a binder and an electrically conductive material, etc.

As the active material for a positive electrode, a lithium transition metal oxide is preferably used. The active material is a main substance causing electromotive reaction of a battery, and means a substance capable of occluding and discharging Li ion. As the transition metal in the lithium transition metal oxide, there are illustrated, manganese, nickel, cobalt, iron, chromium, vanadium, titanium, copper and the like. Of these, manganese, nickel and cobalt are preferred, with manganese and cobalt being particularly preferred. Needless to say, these may be used in combination of two or more. As the lithium transition metal oxides, it is preferred to use, for example, lithium manganese oxide, lithium nickel oxide, lithium cobalt oxide, lithium iron oxide, lithium chromium oxide, lithium vanadium oxide, lithium titanium oxide and lithium copper oxide. Of these, particularly preferred lithium transition metal oxides are lithium manganese oxide and lithium cobalt oxide. These lithium transition metal oxides exhibit remarkable effects of the invention since they suffer serious deterioration of battery properties in a high temperature environment.

As specific composition formula of the lithium transition metal oxide, there are illustrated, for example, those represented by the formula of $LiMn_2O_4$, $LiMnO_2$, $LiNiO_2$, $LiCoO_2$, $LiFeO_2$, $LiCrO_2$, $Li_{1+x}V_3O_8$, $LiV_2O_4$, $LiTi_2O_4$, $Li_2CuO_2$ or $LiCuO_2$. In cases when the lithium manganese oxide is used, it is preferred to use spinel type lithium manganese oxide having a spinel structure as represented by the formula of $LiMn_2O_4$ in the point of exhibiting remarkable effects of the invention. Additionally, in the above-described composition, there may be a slight amount of oxygen defficiency and unfixed ratio properties. Further, part of oxygen sites may be occupied by sulfur or halogen element. Still further, part of sites to be occupied by the transition metal of lithium transition metal oxide may be occupied by other element.

The lithium transition metal oxides to be used in the invention are preferably those wherein a particular transition metal mainly exists as the transition metal and part of the transition metal sites are occupied by other element. As a result, stability of the crystal structure can be improved, leading to improvement of the high temperature properties. This effect is remarkable in the case of using lithium manganese oxides.

As the other element by which part of the transition metal sites are occupied (hereinafter referred to as "substituent element"), there are illustrated metal elements such as Al, Ti, V, Cr, Fe, Co, Li, Ni, Cu, Zn, Mg, Ga and Zr. Of these, Al, Cr, Fe, Co, Li, Ni, Mg and Ga are preferred, with Al being more preferred. Additionally, the transition metal sites may be occupied by two or more of the other elements.

As to occupying proportion (hereinafter referred to as "substitution proportion") of the substituent element, it suffices to select so that average valence number N of manganese in the lithium manganese oxide is in the range of 3.5<N<3.8. Although the proportion slightly varies depending upon kind of the substituent element, it is usually 0.5 mol % or more, preferably 2.5 mol % or more based on the main transition metal. In addition, it is usually 30 mol % or less, preferably 20 mol % or less based on the main transition metal. If the substitution proportion is too small, there can result insufficient effects of improving battery properties in a high temperature environment whereas, if too large, there can result a decrease in capacity when used for a battery.

The lithium transition metal oxides to be used in the invention has a specific surface area of usually 0.01 m²/g or more, preferably 0.3 m²/g or more, more preferably 0.5 m²/g or more, and usually 10 m²/g or less, preferably 5 m²/g or less, more preferably 2.0 m²/g or less. If the specific surface area is too small, there can result a deteriorated battery properties such as deteriorated rating properties or deteriorated capacity whereas, if too large, the oxides can cause unfavorable reactions with the non-aqueous electrolytic solution or the like to deteriorate battery properties such as cycle properties. Measurement of the specific surface area is conducted according to BET method.

The lithium transition metal oxides to be used in the invention has an average particle size of usually 0.1 μm or more, preferably 0.2 μm or more, more preferably 0.3 μm or more, most preferably 0.5 μm or more, and usually 300 μm or less, preferably 100 μm or less, more preferably 50 μm or less, most preferably 20 μm or less. If the average particle size is too small, there can result a serious deterioration of cycle properties of the battery or a problem with stability of the battery. On the other hand, if the average particle size is too large, the internal resistance of a battery can become so large that a desired output is difficultly obtained.

The positive electrode material layer may further contain other active material capable of occluding and discharging lithium ion than the lithium transition metal oxides, such as $LiFePO_4$.

Proportion of the active material in the positive electrode material layer is usually 10% by weight or more, preferably 30% by weight or more, more preferably 50% by weight or more, and is usually 99.9% by weight or less, preferably 99% by weight or less. If the proportion is too large, the electrode using the material tends to have a deteriorated mechanical strength whereas, if too small, battery properties such as capacity tend to be deteriorated.

As a binder to be contained in the positive electrode material layer, there are illustrated, for example, polyvinylidene fluoride, polytetrafluoroethylene, fluorinated polyvinylidene fluoride, EPDM (ethylene-propylene-diene ternary copolymer), SBR (styrene-butadiene rubber), NBR (acrylonitrile-butadiene rubber), isoprene rubber, butadiene rubber, fluorine-contained rubber, polyvinyl acetate, polymethyl methacrylate, polyethylene and nitrocellulose. Proportion of the binder in the positive electrode material layer is usually 0.1% by weight or more, preferably 1% by weight or more, more preferably 5% by weight or more, and usually 80% by weight or less, preferably 60% by weight or less, more preferably 40% by weight or less, most preferably 10% by weight or less. If the proportion of the binder is too low, the binder can fail to sufficiently retain the active material, and mechanical strength of the positive electrode can become insufficient, which causes deterioration of battery performance such as cycle properties. On the other hand, if the proportion of the binder is too large, there can be a reduction in battery capacity and electric conductivity.

The positive electrode material layer usually contains an electrically conductive material for enhancing electric conductivity. As the electrically conductive material, there are illustrated carbon materials such as graphite (e.g., natural graphite and artificial graphite), carbon black (e.g., acetylene black) and amorphous carbon (e.g., needle coke). Proportion of the electrically conductive material in the positive electrode material layer is usually 0.01% by weight or more, preferably 0.1% by weight or more, more preferably 1% by weight or more, and is usually 50% by weight or less, preferably 30% by weight or less, more preferably 15% by weight or less. If the proportion of the electrically conductive material is too small, there can result an insufficient electric conductivity. On the other hand, if the proportion of the electrically conductive layer is too large, there can result a decreased battery capacity.

The positive electrode material layer has a thickness of usually about 1 to about 1000 μm, preferably about 10 to about 200 μm. If the layer is too thick, there results a tendency of decreased electrical conductivity whereas, if too thin, there results a tendency of a decreased capacity.

As a material of the current collector to be used in the positive electrode, there is used aluminum, stainless steel, nickel-plated steel, etc. It is aluminum that is preferred as a material for the current collector to be used in the positive electrode. The current collector has a thickness of usually about 1 to about 1000 μm, preferably about 5 to about 500 μm. If the current collector is too thick, there results a decreased capacity as a lithium secondary battery whereas, if too thin, mechanical strength can become insufficient.

In manufacturing the positive electrode, there is commonly employed a process of preparing a slurry first by dissolving or dispersing solid materials such as an active material for a positive electrode, a binder and an electrically conductive material in a solvent, then coating the slurry on a current collector, followed by evaporating the solvent in the slurry.

As the solvent for the slurry, those organic solvents are commonly used which can dissolve or disperse the binder. Specific examples of the solvent include N-methylpyrrolidone, dimethylformamide, diethylacetamide, methyl ethyl ketone, cyclohexanone, methyl acetate, methyl acrylate, diethyltriamine, N,N-dimethylaminopropylamine, ethylene oxide and tetrahydrofuran. In addition, water may also be usable in some cases.

Additionally, the positive electrode material layer obtained by the coating and drying procedures is preferably pressed by means of a roller press or the like to enhance packing density of the active material.

Additionally, the positive electrode can also be manufactured by employing a process of intimately mixing the active material for a positive electrode, the binder, the electrically conductive material and like materials without using any solvent, forming the mixture into a thin sheet, then pressing and bonding the sheet to the current collector.

Like the positive electrode, the negative electrode usually has a structure comprising a current collector having formed thereon a negative electrode material layer. The negative electrode material layer usually contains an active material for a negative electrode, a binder, an electrically conductive material, a viscosity enhancing agent, etc.

As the active material for a negative electrode, carbonaceous substances capable of occluding and discharging lithium are preferred. Specific examples of the carbonaceous substances include thermal decomposition products of organic materials obtained under various thermal decomposition conditions, artificial graphite, natural graphite and the like. Of these carbonaceous substances, artificial graphite manufactured by high-temperature treatment of easily graphitizable pitch obtained from various starting materials, artificial graphite such as graphitized mesophase globules and graphitized mesophase pitch type carbon fibers, purified natural graphite, or materials prepared by subjecting these graphites to various surface treatment with, for example, pitch are preferably used.

d value (interlayer distance) of the lattice plane (002 plane) of these carbonaceous substances can be determined by X ray diffraction according to method of the Japan Society for Promotion of Scientific Research. This d value (interlayer distance) of the lattice plane (002 plane) is preferably 0.335 to 0.340 nm, more preferably 0.335 to 0.337 nm. In addition, the carbonaceous substances have an ash content of preferably 1% by weight or less, more preferably 0.5% by weight or less, particularly preferably 0.1% by weight or less. Further, the carbonaceous substances have a crystal size (Lc) determined by X ray diffraction according to the method of the Japan Society for Promotion of Scientific Research of preferably 30 nm or more, more preferably 50 nm or more, particularly preferably 100 nm or more.

The carbonaceous substances have a median size measured by the method of laser diffraction and scattering of preferably 1 to 100 μm, more preferably 3 to 50 μm, still more preferably 5 to 40 μm, particularly preferably 7 to 30 μm. The carbonaceous substances have a BET specific surface area of preferably 0.3 to 25.0 m²/g, more preferably 0.5 to 20.0 m²/g, still more preferably 0.7 to 15.0 m²/g, particularly preferably 0.8 to 10.0 m²/g.

In addition, IA/IB intensity ratio, R (IB/IA), of the carbonaceous substances wherein in Raman spectrometry using an argon ion laser, IA represents a peak intensity of a peak in the range of from 1580 to 1620 cm$^{-1}$ and IB represents a peak intensity of a peak in the range of from 1350 to 1370 cm$^{-1}$, is preferably 0 to 1.2. In addition, a half value width of a peak in the range of from 1580 to 1620 cm$^{-1}$ is preferably 26 cm$^{-1}$ or less, particularly preferably 25 cm$^{-1}$ or less.

The above-described carbonaceous substance may further be mixed with an active material for a negative electrode capable of occluding and discharging lithium. As the other active material for a negative electrode capable of occluding and discharging lithium than the carbonaceous substances, there are illustrated metal oxide materials such as tin oxide and silicon oxide, metallic lithium and various lithium alloys. These active materials for a negative electrode capable of occluding and discharging lithium other than the carbonaceous substances may be used in combination of two or more of them.

As to proportion of the active material for a negative electrode to be used in the negative electrode material layer, the binder to be contained in the negative electrode material layer, proportion of the binder in the negative electrode material layer, an optionally used electrically conductive material, proportion of the electrically conductive-material in the negative electrode material layer, and the solvent for preparing a slurry, the same ones described with respect to the positive electrode material layer may be employed as well. As the viscosity enhancing agent, there are illustrated carboxymethyl cellulose, methyl cellulose, hydroxymethyl cellulose, ethyl cellulose, polyvinyl alcohol, oxidized starch, phosphorylated starch, casein and the like.

As a current collector of the negative electrode, copper, nickel, stainless steel, nickel-plated steel and the like are used, with copper being preferably used.

Processes for producing the negative electrode using the active material for a negative electrode are not particularly limited. For example, the negative electrode may be produced by properly adding a binder, a viscosity enhancing agent, an electrically conductive material, a solvent, etc. to the active material for a negative electrode to prepare a slurry, then coating it on a substrate of a current collector, followed by drying. Alternatively, it is also possible to roll-mold the negative electrode material layer into a sheet electrode or to compression-mold it into a pellet electrode.

In cases when a separator is used between a positive electrode and a negative electrode, a finely porous high polymer film is commonly used as the separator. As the finely porous high polymer film, there are illustrated those which comprise nylon, cellulose acetate, nitrocellulose, polysulfone, polyacrylonitrile, polyvinylidene fluoride or a polyolefin polymer such as polypropylene, polyethylene or polybutene. Chemical stability and electrochemical stability of the separator are important factors. In view of this point, polyolefinic polymers are preferred and, from the point of self-closing temperature which is one purpose of battery separators, a polyethylene-made separator is desirable.

In view of the point of high-temperature shape-retaining properties, an ultra-high molecular weight polyethylene is preferable. The lower limit of the molecular weight of ultra-high molecular weight polyethylene is preferably 500,000, preferably 1,000,000, most preferably 1,500,000. On the other hand, the upper limit of the molecular weight is preferably 5,000,000, more preferably 4,000,000, most preferably 3,000,000. If the molecular weight is too large, there results a too low fluidity and, upon heating, pores of the separator are not closed in some cases.

Processes for producing the secondary battery of the invention which comprises at least the negative electrode, the positive electrode and the non-aqueous electrolytic solution are not particularly limited, and a proper one may properly be selected from among commonly employed processes.

The battery of the invention is not limited as to its shape, and there may be employed a cylinder type wherein sheet electrodes and a separator are in a spiral form, a cylinder type of an inside-out structure wherein pellet electrodes are combined with a separator, and a coin type wherein pellet electrodes and a separator are piled one over the other.

In addition, in the invention, a known polymer may be contained in the non-aqueous electrolytic solution to render the electrolyte non-fluid.

The invention will be described specifically by reference to examples which, however, are not construed as limiting the invention in any way.

EXAMPLE 1

1. Preparation of Positive Electrodes

As an active material for a positive electrode, lithium manganese oxide ($Li_{1.0}Mn_{1.9}Al_{0.1}O_4$) having a cubic spinel structure wherein part of Mn sites are occupied by Al was used. A positive electrode material layer was produced in the following manner. That is, an active material for a positive electrode, acetylene black and polytetrafluoroethylene powder were weighed in a proportion of 75% by weight, 20% by weight and 5% by weight, respectively, based on the total weight of the active material, acetylene black and polytetrafluoro-ethylene powder, and were well mixed in a mortar, followed by forming the resulting mixture into a thin sheet-like shape. Then, 9 mmØ and 12 mmØ discs were punched out from the sheet-like positive electrode material layer using a 9 mmØ punch and a 12 mmØ punch. In this case, the whole weight of the positive electrode material layer was adjusted so that the 9 mmØ discs weighed about 8 mg, and the 12 mmØ discs weighed about 18 mg. These disc-shaped positive electrode material layers were pressed and bonded to Al expanded metal to prepare positive electrodes.

2. Determination of Capacity of the Positive Electrodes

Capacity of each positive electrode was determined as follows. The 9 mmØ disc-like positive electrode was used as a test electrode, and a battery cell was assembled using metallic Li as an opposite electrode. This battery cell was subjected to constant current charge of 0.5 MA/cm² up to 4.35 V during which the reaction of discharging lithium ion from the positive electrode proceeds, then subjected to constant current discharge of 0.5 mA/cm² down to 3.2 V during which lithium ion is occluded by the positive electrode. The initial charging capacity per unit weight of the active material for the positive electrode was taken as Qs (C) (mAh/g), and initial discharging capacity as Qs(D)(mAh/g).

3. Preparation of Negative Electrodes and Determination of Their Capacity:

As an active material for a negative electrode, graphite powder (d002=3.35 Å) having an average particle size of about 8 to about 10 μm was used. As a binder, polyvinylidene fluoride was used. The active material for a negative electrode and the binder were mixed in a weight ratio of 92.5:7.5 in an N-methylpyrrolidone solution to prepare a slurry for forming a negative electrode material layer. This slurry was coated on one side of a 20-μm thick copper foil and, after drying to evaporate the solvent, a 12 mmØ disc was punched therefrom to prepare negative electrodes.

Capacity of the negative electrode was determined as follows. The 12 mmØ disc-like negative electrode was used as a test electrode, and a battery cell was assembled using metallic Li as an opposite electrode. This battery cell was subjected to a test of occluding Li ion by the negative electrode at a constant current of 0.2 mA/cm$^2$ down to 0 V to determine the initial occluding capacity per unit weight of the active material for the negative electrode, Qf(mAh/g).

4. Preparation of a Non-aqueous Electrolytic Solution

Lithium hexafluorophosphate (LiPF$_6$) was dissolved in a 3:7 by volume mixture solvent of ethylene carbonate (EC) and diethyl carbonate (DEC) in an amount to make a 1 mol/liter solution, thus a "solution for an electrolytic solution" being prepared. Then, 1.03 g of 2,6-di-tert-butyl-4-methylpyridine was dissolved in 1 kg of this "solution for an electrolytic solution" (concentration: 5 mM, 0.103% by weight) to prepare a non-aqueous electrolytic solution.

5. Assembling a Battery Cell

A battery performance was evaluated using a coin-type cell. The coin-type cell was prepared as follows.

A 12 mmØ-punched positive electrode material layer having been pressed and bonded to an Al expanded metal was mounted on a positive electrode can and, after placing a 25 μm porous polyethylene film as a separator on the positive electrode, a polypropylene-made gasket was disposed in the space along the periphery of the positive electrode can. Subsequently, the negative electrode was placed on the separator, and a spacer for adjusting thickness was further placed on the negative electrode, followed by placing a negative electrode can and sealing the battery. Additionally, the positive electrode, the separator and the negative electrode were previously wet with the non-aqueous electrolytic solution having been prepared.

Weight of the active material for a positive electrode and weight of the active material for a negative electrode were selected so that almost the following equation can hold:

$Qf$×Weight (g) of the active material for a negative electrode=1.2× $Qs(C)$×Weight (g) of the active material for a positive electrode 6. Cycle Test in a High Temperature Environment In order to compare high temperature properties of the thus obtained batteries, the following tests were conducted with adjusting a current value per 1 hour (i.e., 1C), that is 1 C was defined by the following formula:

1 C (mA)=$Qs(D)$×Weight (g) of the active material for a positive electrode/h.

First, 2 charge-and-discharge cycles was conducted at room temperature at a constant current of 0.2 C., and one charge-and-discharge cycle was conducted at a constant current of 1 C. Then, one charge-and-discharge cycle was conducted at 50° C. at a constant current of 0.2 C., then 100 charge-and-discharge cycles at a constant current of 1 C. Additionally, the upper limit voltage upon charge and discharge was controlled to be 4.2 V, and the lower limit to be 3.0 V.

Discharge capacity was measured upon completion of the 100 charge-and-discharge cycles at 50° C. at a constant current of 1 C. Results thus obtained are shown in Table 2.

EXAMPLE 2

Cycle tests were conducted in a high temperature environment in the same manner as in Example 1 except for using 2-tert-butylpyridine in place of 2,6-di-tert-butyl-4-methylpyridine in "4. Preparation of a non-aqueous electrolytic solution" and dissolving 0.68 g of 2-tert-butylpyridine in 1 kg of a "solution for an electrolytic solution" (concentration: 5 mM, 0.068% by weight). Results thus obtained are shown in Table 2.

EXAMPLE 3

Cycle tests were conducted in a high temperature environment in the same manner as in Example 1 except for using 2-propylpyridine in place of 2,6-di-tert-butyl-4-methylpyridine in "4. Preparation of a non-aqueous electrolytic solution" and dissolving 0.61 g of 2-propylpyridine in 1 kg of a "solution for an electrolytic solution" (concentration: 5 mM, 0.061% by weight). Results thus obtained are shown in Table 2.

Comparative Example 1

Cycle tests were conducted in a high temperature environment in the same manner as in Example 1 except for using 2-ethylpyridine in place of 2,6-di-tert-butyl-4-methylpyridine in "4. Preparation of a non-aqueous electrolytic solution" and dissolving 0.54 g of 2-ethylpyridine in 1 kg of a "solution for an electrolytic solution" (concentration: 5 mM, 0.054% by weight). Results thus obtained are shown in Table 2.

Comparative Example 2

Cycle tests were conducted in a high temperature environment in the same manner as in Example 1 except for not using 2,6-di-tert-butyl-4-methylpyridine in "4. Preparation of a non-aqueous electrolytic solution". Results thus obtained are shown in Table 2.

TABLE 2

| | Pyridine Compound | Discharge Capacity After 100 Cycles (mAh/g) |
|---|---|---|
| Example 1 | 2,6-di-tert-butyl-4-methylpyridine | 82 |
| Example 2 | 2-tert-butylpyridine | 75 |
| Example 3 | 2-propylpyridine | 73 |
| Comparative Example 1 | 2-ethylpyridine | 70 |
| Comparative Example 2 | Not added. | 70 |

Comparison of Examples 1 to 3 with Comparative Example 2 reveals that cycle properties in a high temperature environment can be improved by incorporating 2-propylpyridine, 2-tert-butylpyridine or 2,6-di-tert-butyl-4-methylpyridine in the non-aqueous electrolytic solution.

In particular, it is seen from the results of Comparative Example 1, Example 3 and Example 2 that cycle properties at a high temperature can be more improved as number of carbon atoms in the substituent alkyl group increases from 2 to 4. It is also seen that the cycle properties at a high temperature can be much more improved as number of the alkyl groups bound to the pyridine ring increases (Example 1). The results of Example 1 reveals that, when alkyl groups are bound to 2-, 4- and 6-positions of pyridine ring, cycle properties in a high temperature environment can be remarkably improved.

On the other hand, comparison of the results of Comparative Example 1 (wherein 2-ethylpyridine, described in "Hyomen Gijutsu", vol. 46, No. 12, p. 1187 (1995) which is believed to be the most-related known literature, is added) with the results of Comparative Example 2 reveals that cycle properties in a high temperature environment cannot be improved by adding 2-ethylpyridine.

According to the invention, there can be obtained a non-aqueous electrolytic solution capable of providing excellent battery properties by incorporating a specific pyridine compound having a substituent or substituents in a non-aqueous electrolytic solution. Particularly, there can be obtained a non-aqueous electrolytic solution capable of improving cycle properties at a high temperature.

Further, there can be obtained a lithium secondary battery excellent in battery properties by using this non-aqueous electrolytic solution. In particular, a lithium secondary battery having improved cycle properties at a high temperature can be obtained.

While the invention has been described in detail and with reference to specific embodiments thereof, it will be apparent to one skilled in the art that various changes and modifications can be made therein without departing from the spirit and scope thereof.

This application is based on Japanese patent application No.2000-213624 filed on Jul. 14, 2000 the entire contents thereof being hereby incorporated by reference.

What is claimed is:

1. A non-aqueous electrolytic solution comprising an organic solvent and a lithium salt, which further contains a pyridine compound represented by the following formula (1):

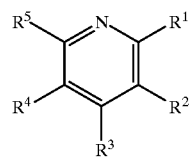

(1)

wherein $R^1$ to $R^5$ each independently represents a hydrogen atom or a substituent composed of an alkyl group having 1 to 20 carbon atoms, an alkoxy group having 1 to 4 carbon atoms, an aryloxy group having 6 to 10 carbon atoms, and a dialkylamino group having 2 to 8 carbon atoms, with the proviso that, at least one of $R^1$ to $R^5$ represents aforesaid substituent and that, when each of $R^1$ to $R^5$ are a hydrogen atom or an alkyl group, at least one of $R^1$ to $R^5$ is an alkyl group having 4 or more carbon atoms and that, when $R^1$ to $R^5$ each independently represents a phenyl group, two or more of $R^1$ to $R^5$ represent phenyl groups.

2. The non-aqueous electrolytic solution as claimed in claim 1, wherein at least one of $R^1$ to $R^5$ in the formula (1) represents an alkyl group having 1 to 20 carbon atoms with the proviso that, when $R^1$ to $R^5$ are a hydrogen atom or an alkyl group, at least one of $R^1$ to $R^5$ is an alkyl group having 4 or more carbon atoms.

3. The non-aqueous electrolytic solution as claimed in claim 1, wherein, when $R^1$ to $R^5$ in the formula (1) are a hydrogen atom or an alkyl group, sum of the carbon atoms of $R^1$ to $R^5$ is 5 or more.

4. The non-aqueous electrolytic solution as claimed in claim 1, wherein, when $R^1$ to $R^5$ in the formula (1) are a hydrogen atom or an alkyl group, sum of the carbon atoms of $R^1$ to $R^5$ is 60 or less.

5. The non-aqueous electrolytic solution as claimed in claim 1, wherein $R^1$ and $R^5$ in the formula (1) are independently a substituent selected from the group consisting of an alkyl group having 1 to 20 carbon atoms, an alkoxy group having 1 to 4 carbon atoms, an aryloxy group having 6 to 10 carbon atoms, and a dialkylamino group having 2 to 8 carbon atoms.

6. The non-aqueous electrolytic solution as claimed in claim 5, wherein $R^3$ is also a substituent selected from the group consisting of an alkyl group having 1 to 20 carbon atoms, an alkoxy group having 1 to 4 carbon atoms, an aryloxy group having 6 to 10 carbon atoms, and a dialkylamino group having 2 to 8 carbon atoms.

7. The non-aqueous electrolytic solution as claimed in claim 1, wherein said pyridine compound is at least one member selected from the group consisting of 3-butylpyridine, 4-butylpyridine, 4-isobutylpyridine, 2-methyl-5-butyl-pyridine, 2-tert-butylpyridine, 4-tert-butylpyridine, 2,6-di-tert-butylpyridine, 2,6-di-tert-butyl-4-methylpyridine, 2,4,6-tri-tert-butylpyridine, 2-tert-butyl-6-methyl-pyridine, 2-tert-butyl-4-methylpyridine, 4-tert-butyl-2-methylpyridine, 2-tert-butyl-6-isopropylpyridine, 4-(5-nonyl)pyridine, 2-pentylpyridine, 2-(3-pentyl)pyridine, 4-(3-pentyl)pyridine, 2-hexylpyridine, 4-octylpyridine, 2-undecylpyridine, 2-(1-butylpentyl)pyridine, 2,6-di-tert-butyl-4-(dimethylamino)pyridine, 2-dimethylaminopyridine, 2-methoxypyridine, 2-phenoxypyridine, 3-methoxypyridine.

8. The non-aqueous electrolytic solution as claimed in claim 1, wherein said pyridine compound is a pyridine compound having a bonding energy of 16 kcal/mol or more with hydrofluoric acid determined according to the following calculation method:

(method for calculating bonding energy)

A bonding energy between the pyridine compound and hydrofluoric acid is calculated according to ab initio method (program: Gaussian 94; base set: 3–21 G); and the term "bonding energy" as used herein means a value obtained by summing the energy values of the pyridine compound and hydrofluoric acid determined by geometry optimization of each of them, and subtracting from the sum the energy value determined by geometry optimization of an adduct of the pyridine compound and hydrofluoric acid connecting to each other through nitrogen atom of the pyridine compound and hydrogen atom of hydrofluoric acid, that is, (Bonding energy)=(Energy value of the pyridine compound)+(Energy value of hydrofluoric acid)−(Energy value of the adduct between the pyridine compound and hydrofluoric acid).

9. The non-aqueous electrolytic solution as claimed in claim 1, wherein said pyridine compound is contained in an amount of 0.001% by weight based on the sum of the organic solvent and the lithium salt to saturation.

10. The non-aqueous electrolytic solution as claimed in claim 1, wherein said lithium salt is a compound containing a fluorine atom or fluorine atoms.

11. A secondary battery, which comprises the non-aqueous electrolytic solution claimed in claim 1, a positive electrode and a negative electrode.

12. The secondary battery as claimed in claim 11, wherein said positive electrode comprises an active material for a positive electrode, said active material for a positive electrode being a lithium transition metal oxide.

13. The secondary battery as claimed in claim 12, wherein said lithium transition metal oxide is lithium manganese oxide or lithium cobalt oxide.

14. The secondary battery as claimed in claim 13, wherein said lithium manganese oxide is spinel type lithium manganese oxide.

15. The secondary battery as claimed in claim 13, wherein said lithium manganese oxide is lithium manganese oxide wherein part of manganese sites are occupied by other element.

16. The secondary battery as claimed in claim 15, wherein said other element occupying the manganese sites is at least one metal element selected from the group consisting of Al, Ti, V, Cr, Fe, Co, Li, Ni, Cu, Zn, Mg, Ga and Zr.

17. The secondary battery as claimed in claim 11, wherein said negative electrode comprises an active material for a negative electrode, said active material for a negative electrode being a carbonaceous substance.

18. The secondary battery as claimed in claim 17, wherein said carbonaceous substance is graphite having a d value of lattice plane (002 plane) in X ray diffraction of 0.335 to 0.340 nm.

* * * * *